(12) United States Patent
Nortung

(10) Patent No.: US 7,322,048 B2
(45) Date of Patent: Jan. 22, 2008

(54) CONTROL DEVICE FOR A COMPUTER AND A COMPUTER COMPRISING SUCH A CONTROL DEVICE

(75) Inventor: Rene Nortung, Allerod (DK)

(73) Assignee: Remedan APS, Allerod (DK)

( * ) Notice: Subject to any disclaimer, the term of this patent is extended or adjusted under 35 U.S.C. 154(b) by 788 days.

(21) Appl. No.: 10/277,129

(22) Filed: Oct. 22, 2002

(65) Prior Publication Data
US 2003/0163714 A1    Aug. 28, 2003

Related U.S. Application Data

(63) Continuation-in-part of application No. 09/868,465, filed as application No. PCT/DK00/00005 on Jan. 7, 2000, now abandoned.

(30) Foreign Application Priority Data
Jan. 7, 1999    (DK) ................ 1999 00011

(51) Int. Cl.
*G06F 21/00* (2006.01)
*G06F 13/00* (2006.01)
(52) U.S. Cl. ............ 726/34; 726/16; 713/300; 710/301
(58) Field of Classification Search .......... None
See application file for complete search history.

(56) References Cited

U.S. PATENT DOCUMENTS

| 5,187,352 A | 2/1993 | Blair et al. |
|---|---|---|
| 5,202,997 A | 4/1993 | Arato |
| 5,313,639 A | 5/1994 | Chao |
| 5,434,562 A | 7/1995 | Reardon |

(Continued)

FOREIGN PATENT DOCUMENTS

| WO | WO 90/13084 | 11/1990 |
|---|---|---|
| WO | WO 94/27224 | 11/1994 |

OTHER PUBLICATIONS

"How CIMScan addresses the requirements of FDA 21 CFR Part 11 in both Closed and Open Systems", pp. 1-13.*

(Continued)

*Primary Examiner*—Christopher Revak
(74) *Attorney, Agent, or Firm*—Reed Smith LLP; Stanley P. Fisher, Esq.; Juan Carlos A. Marquez, Esq.

(57) ABSTRACT

A control device for use with a computer, where the computer has one or more connectors for connecting equipment such as peripherals, human interfaces, test equipment and production facilities to the computer for communicating with the equipment. The control device has a set of first connectors for connecting the equipment to the control device, and a set of second connectors for connecting to the one or more connectors of the computer to enable the computer to communicate with equipment connected to the one or more first connectors. Communication between the computer and the equipment connected to the first set of connectors is stored in a memory of the control device. The control device thus creates an audit trail in compliance with FDA 21 CFR Part 11, whereby a conventional computer and equipment connected thereto is made 21 CFR Part 11 compliant.

52 Claims, 4 Drawing Sheets

U.S. PATENT DOCUMENTS

| | | |
|---|---|---|
| 5,555,373 A | 9/1996 | Dayan et al. |
| 5,574,786 A | 11/1996 | Dayan et al. |
| 6,237,100 B1 * | 5/2001 | Cromer et al. .............. 713/300 |
| 6,609,207 B1 * | 8/2003 | Cromer et al. ................ 726/35 |
| 6,615,356 B1 * | 9/2003 | Byun .......................... 726/36 |

OTHER PUBLICATIONS

"Guidance for Industry Part 11, Electronic Records; Electronic Signatures—Scope and Application", Aug. 2003, Pharmaceutical CGMPs, pp. 1-9.*

"21 CFR Part 11 Electronic Records; Electronic Signatures; Final Rule Electronic Submissions; Electronic Submissions; Establishment of Public Docket; Notice", Mar. 20, 1997, Federal Register, vol. 62, No. 54, pp. 13460-13466.*

* cited by examiner

CONTROL DEVICE FOR A COMPUTER AND A COMPUTER COMPRISING SUCH A CONTROL DEVICE

This Application is a Continuation-in-Part of U.S. patent application Ser. No. 09/868,465, filed Aug. 1, 2001 now abandoned which in turn is a National Stage of PCT/DK00/000005 filed Jan. 7, 2000.

FIELD OF THE INVENTION

The invention relates to a control device for use in a computer. In particular the invention relates to a control device for preventing unauthorized use of the computer and allowing only authorized use. Authorized use includes user dependent access to functions and internal operative devices of the computer such as storage devices and files and records stored thereon, and its human interface units such as keyboard and mouse, but also to external or peripheral equipment communicating with the computer. Further, the invention relates to a control device that keeps a record also known as an "audit trail" registering each user's full activities on the computer.

BACKGROUND OF THE INVENTION

With personal computers becoming ever more popular over the past years, electronic documents have gradually taken the place of handwritten documents. Electronic documents offer many advantages over paper documents, but they also involve disadvantages relating to issues such as electronic data security.

21 CFR Part 11 is a code of regulations designed by the FDA to promote the use of electronic data and electronic signatures for documenting, inter alia, pharmaceutical products. 21 CFR Part 11 provides guidelines for the use of electronic tools in connection with the manufacture of products approved by the FDA.

The 21 CFR Part 11 regulations came into force in August 1997, but do not grant exemption for systems put into use before that date. Therefore, all systems subject to FDA control must comply with 21 CFR Part 11.

The general idea of 21 CFR Part 11 is that companies should at all times be able to document who did what and when. An indispensable requirement is that all data modifications must be traceable, whether intended modifications, wrong corrections or outright falsifications. This version management of all electronic data is referred to as an "audit trail" according to the terminology used in 21 CFR Part 11.

The audit trail requirement for electronic data is relatively new for pharmaceutical products, but the concept is established in the financial sector and in accounts departments globally, which have had to comply with similar requirements for decades.

It is well known that computers are typically composed of a plurality of operative units, such as floppy disk drives, hard disks, modems, network connections and graphical accelerator cards. It is of interest in this connection to be able to cause the computer to operate in several different states where operative units are connected and disconnected in dependence on the selected state. It is eg desirable that access to an operative unit is allowed in a first state, while this access is not allowed in a second state. This may inter alia be desirable in order to secure personal data on the hard disk of a computer, which is used by several users. This security can eg comprise security against unintentional destruction of personal data as well as security against spreading of virus between operative units in the computer.

It is therefore of interest to provide a control device for computers with one or more operative units where the computer can operate in at least two states, and where the control device is adapted to connect and disconnect the operative units in dependence on the state in which the computer is to operate.

In research work such as in the medical research industry developing and manufacturing medical devices and drugs it is of utmost importance that all research work can be precisely documented. In case of amendments (eg by additions, changes or deletions) being made to existing files that it can be established beyond any doubt who made the amendment and when. Such documentation is of great value, if not a requirement, for having a newly developed device or drug approved by national or supranational authorities such as the United States Food and Drug Administration (FDA). Each production batch of medical drugs must be documented in detail. Each human intervention in the production process potentially involves the risk of errors being made, which can have serious consequences. It is therefore essential to have a complete and reliable record, at each step in the production process, of both human intervention and automatic steps carried out. This allows possible errors or minor deviations to be tracked.

DISCUSSION OF PRIOR ART

U.S. Pat. No. 5,434,562 describes a control device for a computer with one or more operative units. The control device comprises switch devices, which the user can switch between various positions. The position of the switch determines the access to a given operative unit. For example, in a first position the switch can interrupt the data connections to a hard disk, while in a second state it can establish the same data connections.

WO 00/43855 discloses a control device for a computer and to a computer comprising a control device as shown in FIGS. 1-3. The computer has a motherboard (4) and one or more operative units (7, 8, 9, 18), and a power supply unit (11) for supplying electrical power to the motherboard and to the one or more operative units, and electrical interconnections (3A, 3B, 3C, 3D, 6, 5A, 5B, 12A, 12B, 12C, 12D, 10) for interconnecting the motherboard, the one or more operative units and the power supply unit, the computer being capable of operating in at least a first state, in which a first group of the one or more operative units are operable, and in a second state, in which a second group of the one or more operative units are operable. The control device is adapted, in dependence on the state in which the computer is to operate, to establish selected ones of the electrical interconnections so as to make corresponding operative units operable, and to interrupt selected ones of the electrical interconnections, so as to make corresponding operative units inoperable. Characteristic technical features are that the control device comprises an input device (20, 21) by means of which one or more codes may be supplied to the control device, and means (24) which specify a relation between codes and the states, and which is adapted, on the basis of codes received through the input device and of the relation between codes and the states, to select a state in which the computer is to operate and to establish the electrical interconnections to the group of operative units to be operable in the selected state, and following this, and before the computer is configured, to establish the electrical interconnection (6) between the power supply unit and the motherboard.

The above described prior art device provides a control device, which makes it possible to bring the computer into one of a number of specified states in a simple manner, which reduces the risk of the user bringing the computer into an undesired state among the number of states, and which can ensure optimum resource allocation in that the state is eg adapted to the user's needs.

The above described prior art control device can make a state-specific allocation of resources so that the computer may be optimized for various tasks in various states of the computer. Allocation of resources takes place before the computer is connected to the power supply. This means that eg data, which must be accessible in some states of the computer, may be secured in other states. This is desirable eg when a computer is used by several users and for securing selected parts of the computer against computer virus. For example, unauthorized use of the computer for changing a pre-allocated state is not possible. In addition, it is possible to prevent the specified relation between codes and the states from being changed using the computer, which is an important advantage. This is made possible in that the control device determines the states, in which the computer is to operate, before the computer is connected to the power supply and can be started. Thus, unauthorized access to the control device is prevented.

The prior art control device is simple to use in connection with computers having many operative units and which is desirably used in several different states. It comprises one or more mass storage units, which enables security of data in given states. The control device comprises one or more connections to one or more of the operative units, and the control device is adapted to perform the connection and disconnection by the use of the connections. One or more of the connections can be data connections, in which case the control device is adapted to perform the connection and disconnection by physically making and breaking the data connections. One or more of the connections can be command and control connections, in which case the control device is adapted to perform the connection and disconnection by affecting the command and control connections. One or more of the connections can be power supply connections, in which case the control device is adapted to perform the connection and disconnection by physically making and breaking the power supply connections.

The input device comprises a keyboard or keypad, by means of which the one or more codes may be supplied to the control device. This ensures that a user can define a code easily and simply, and the risk of bringing the computer into an undesired state is hereby minimized. The input device comprises a card-reading unit, by means of which the one or more codes may be supplied to the control device. This provides the advantage that unique identification of the user may be performed in a simple manner if eg cards containing user-specific card codes are used. The user-specific card codes can be included in a magnetic strip or in a chip on the card. The control device comprises a device to ensure that the specification of the relation between the codes and the states is allowed only after a code or password has been manually input by the user in addition to the user-specific code on the card. This provides security against undesired change of the states, as only selected users can make changes of the specification.

The prior art control device comprises a supervisory unit, which is adapted to currently supervise contact or communication with one or more of the operative units, and the control device is adapted, on the basis thereof, to select the state in which the computer is to operate. The state may thus be selected before, during or after the first start or a re-start of the computer. This ensures that a user cannot intentionally or unintentionally eg switch the connection to various peripheral units and hereby obtain unauthorized access to one or more such operative units.

WO 00/43855 also discloses a computer comprising one or more operative units and such a control device. The computer is capable of operating in at least two states, and the control device is adapted to connect and disconnect the operative units in dependence on the state, in which the computer is to operate, the control device additionally comprises an input device by means of which one or more codes may be supplied to the control device, and means which specify a relation between codes and the states, and which are adapted, on the basis thereof, to select the state in which the computer is to operate.

WO 00/43855 also discloses a method of connecting and disconnecting operative units in a computer which can operate in at least two states, the connection and disconnection of the operative units is performed in dependence on the state, in which the computer is to operate, where such state is selected by the control device on the basis of one or more supplied codes and a specified relation between codes and the states.

SUMMARY OF THE INVENTION

The control device of the invention is a piece of hardware that includes selected ones or, preferably, all of the structural and functional features of the above described prior art control device. In addition, the control device of the invention is an audit trail logger that records all traffic or communication with the host computer. The control device of the invention is a computer that operates independently of the operating system and software applications on the host computer and thus makes existing equipment FDA 21 CFR Part 11 compliant. The control device of the invention thus offers Access control to the operative units of the computer User log Log-off function Allocation of user rights Electronic recording of raw data-ER Recording of audit trail Protection against physical break-in on equipment Storing and moving log files to GXP or other secure network drive

DETAILED DESCRIPTION OF THE INVENTION

Figure 1:
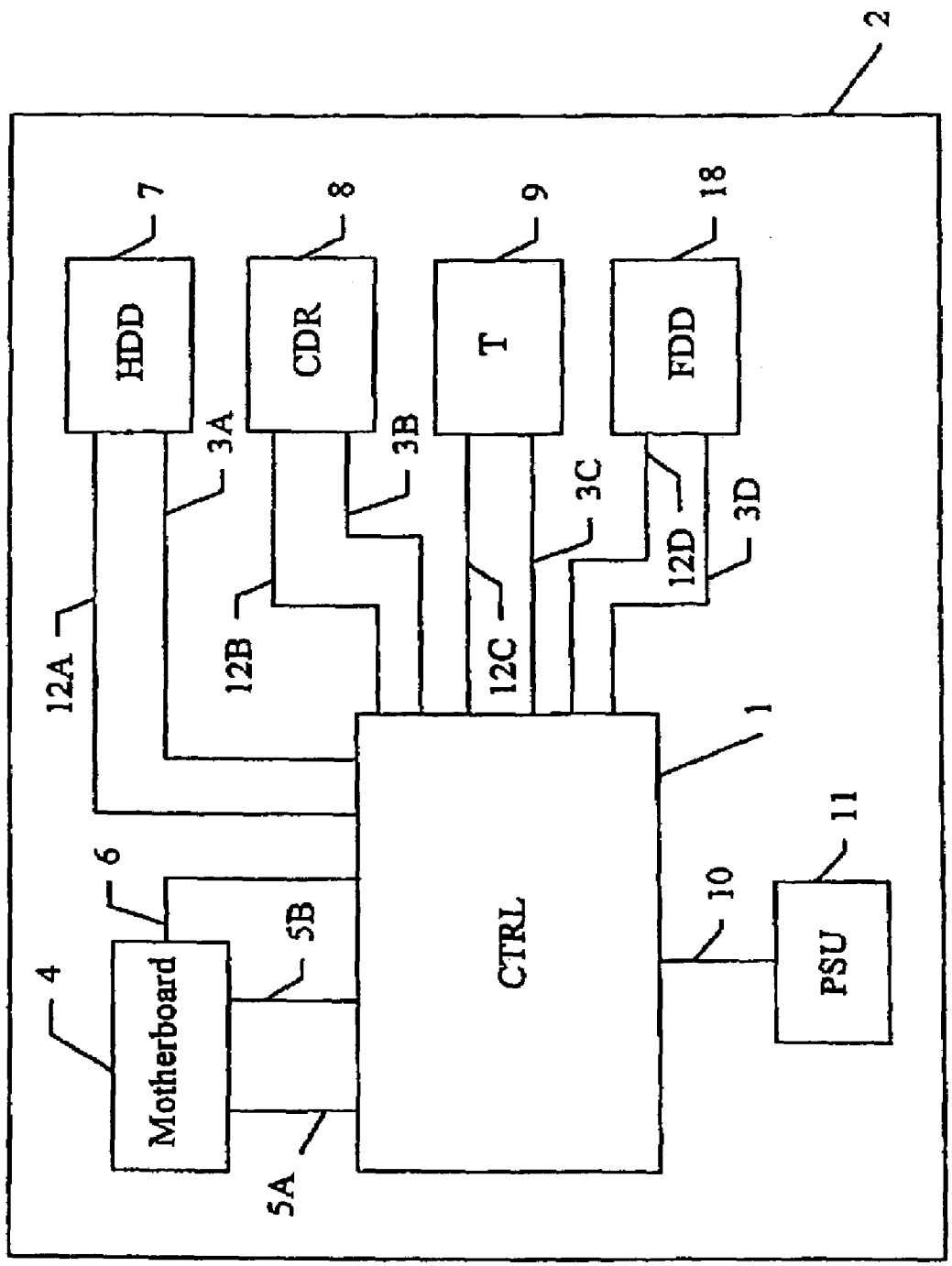
FIG. 1 illustrates a computer with a prior art control device.

FIG. 1 shows a prior art control device to be described below, which is known form the above-identified WO 00/43855, and which is a part of the control device of the present invention. It should be mentioned, however, that a control device according to the invention may be implemented in several ways, the one illustrated below being just one of these. As the invention relates to a control device for a computer as well as a computer with a control device of this type, a description will be given below of a control device 1 according to the invention and a computer comprising a control device 1 according to the invention, respectively. In the embodiment shown, the control device 1 is incorporated in a computer 19.

In FIG. 1, the computer comprises a plurality of operative units: a motherboard 4, one or more mass storage devices, a power supply 11, and one or more transmission devices 9. The motherboard or base card 4 is connected to the control device 1 via a plurality of connections 5A, 5B, 6. The connection 5A may eg be a data connection, which may be used for data transfer between the base card 4 and the control device 1, while the connection 5B may eg be a command and control connection so that the control device can command and control the base card 4. The connection 6 illustrates a current connection between the control device 1 and the base card 4. This connection 6 may be used for supplying the base card 4 with current.

The control device 1 is likewise connected to the power supply 11 via the power connection 10, which is adapted to feed a current from the power supply 11 to the control device 1. As mentioned, the operative units in the computer also comprise one or more mass storage devices. In the embodiment shown, these mass storage devices comprise: a hard disk 7, a CD-ROM drive 8 and a floppy disk drive 18. It should be mentioned, however, that many different mass storage devices may be used in this connection. In addition to hard disk, floppy disk drive and CD-ROM drive, mention may be made of eg: ZIP drive, SyQuest drive, MO drive, band stations, RAM cards, RAM disks.

In the same manner as the control device 1 was connected to the base card 4 by a plurality of connections, the control device is connected to the other operative units. In the example shown, the control device 1 is connected to the hard disk 7 via the connections 3A and 12A. The connection 3A illustrates a power connection, which is adapted to feed current from the control device 1 to the hard disk 7. The connection 12A illustrates a data connection, which is adapted to carry data to and from the control device 1 and the hard disk 7. In the example shown, there are thus just two connections 3A, 12A between the control device 1 and the hard disk 7, but a larger number of connections might be present of course, eg there might be a number of control and command connections between the control device 1 and the hard disk 7 so that the control device 1 could control the function of the hard disk. These connections, however, are not shown in the present case.

Correspondingly, the control device 1 is connected to the other mass storage devices. Thus, there are connections between the control device 1 and the CD-ROM drive 8, and in the example shown the connection 3B illustrates a command and control connection, whereby the control device can command and control the function of the CD-ROM drive 8. The connection 12B illustrates a power connection, which is adapted to supply the CD-ROM drive 8 with current. The floppy disk drive 18 is likewise connected to the control device 1 by a plurality of connections. In this case, too, two connections are shown, even though any number of connections may be provided between these operative units of course, and the connection 3D illustrates a data connection, while a command and control connection is illustrated by the connection 12D.

Finally, the operative units of the computer comprise a transmission device 9, which, like the other operative units, is connected to the control device 1. Like for the other operative units, the connections between the control device 1 and the transmission device 9 illustrate that a plurality of different connections may be provided between these. For example, the connection 3C may conceivably be a power connection, while the connection 12C may illustrate a data connection.

It should be noted that even though all the operative units in the example shown are connected to the control device 1, the computer may of course also contain a plurality of operative units which are not connected to the control device, but which operate by having a direct connection to one or more other operative units in the computer 19. Such operative units, however, are not illustrated in the figure, since these are not particularly relevant relative to the invention.

As will appear from FIG. 1, the control device 1 is thus connected to a plurality of the operative units of the computer. The control device is arranged such that it can connect and disconnect the operative units in such a manner that a connected operative unit may be caused to connect to another connected operative unit, and so that disconnection of an operative unit can prevent other operative units from contacting this operative unit. The computer 19 is adapted to operate in at least two states, and the control device 1 is adapted to connect and disconnect the operative units in dependence on the state in which the computer is to operate. For example, it is conceivable that in a given state the computer does not allow access to the hard disk 7. In this situation, the control device 1 may thus disconnect the operative unit 7, while operative units that should desirably be accessible to other operative units in the computer are connected before start.

As will be described below, the control device 1 is arranged such that one or more codes may be supplied to it, and the control device 1 comprises means, which specify the relation between codes and the states. These means are adapted to select the state in which the computer is to operate on the basis of the given code.

The control device 1 can thus cause the computer to assume a plurality of states on the basis of one or more supplied codes. By connecting a large number of operative units to the control device it is thus possible to specify a large number of states in which the computer can operate, and by allowing the control device to be connected to the base card 4 it is eg also possible to disconnect the base card 4 and thereby prevent the computer from functioning. This may eg be utilized in the situation where the supplied code or codes are not accepted by the control device. These conditions will be described more fully below.

It may moreover be mentioned that the computer 19 may comprise a cabinet 2 in which one or more of the operative units are incorporated. In the case shown, the cabinet 2 thus encloses all the operative units of the computer and the control device 1.

As will appear from FIG. 1, the computer 19 comprises a housing or cabinet 2. In a particularly expedient embodiment, the control device 1 is adapted to detect whether the cabinet 2 has been opened and, on the basis thereof, to select the state, in which the computer or the PC (personal computer) operates, eg by causing the PC or parts thereof to assume a locked state so that this/these cannot be used directly, ie without specific authorization by a supervisor or administrator. This may be implemented in that the control device is connected to a mechanical contact 43 in the PC. The contact 43 is activated when the PC is started. By allowing the control device to be driven by its own power supply, eg a battery, it is ensured that this detection may be performed even when the PC is turned off. Unwarranted access causes a signal to be applied to the control device 1 which can then block all or selected operative units. The power supply to the PC may be interrupted hereby. The administrator has to start the PC again. In an expedient embodiment, the cabinet 2 may be locked.

Figure 2:
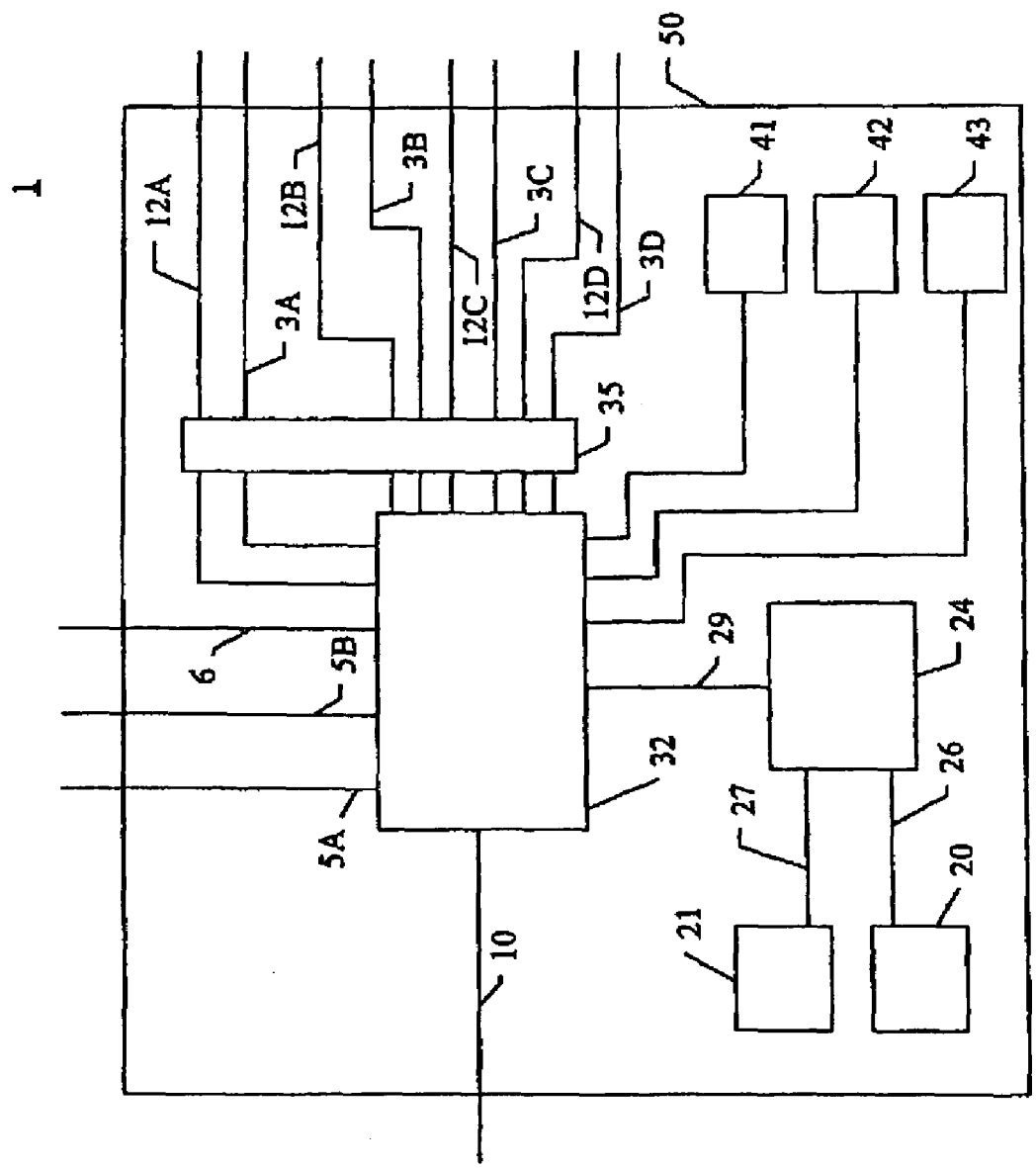
FIG. 2 shows the prior art control device in FIG. 1.

FIG. 2 illustrates a possible structure of a control device 1 according to the invention. The control device comprises input devices 20 and 21, means 24 specifying a relation between codes and states, and means 32 adapted to connect and disconnect operative units. As will appear from FIG. 2, the means 32 have a plurality of connections which are numbered corresponding to the connections in FIG. 1. These connections are contemplated to establish connections between the means 32 and various operative units in the computer 19.

As mentioned above, the control device 1 is adapted to connect and disconnect a plurality of coupled operative units. This connection and disconnection is performed in the example shown by using the means 32, which are adapted to perform this connection and disconnection by using the supplied connections. In the case where a connection is a data connection, this connection and disconnection may be performed by the means 32 by making or breaking the data connections, eg by using a switch, a relay or the like. In the case where the connections are command and control connections, the connection and disconnection may be performed by affecting selected command and control connections in a suitable manner. For example, a state, which just allows reading of data from a mass storage device, may be achieved in that the control device 1 feeds a read only signal to the mass storage device concerned. Corresponding connection and disconnection of operative units may be performed by using other suitable control and command signals, such as M/B, reset and device enable of the system.

As will appear from FIG. 2, the input devices 20 and 21 are connected to the means 24 which specify a relation between codes and states. This allows a user to allocate one or more codes to the means 24 eg by using the keyboard 20, by using a card reader 21, or by a combination of these. On the basis of the supplied code, the means 24 may indicate a state, and by feeding the information on this state to the means 32, these means 32 may be caused to perform the connection or disconnection corresponding to the desired state.

Many different input devices may be used, of course. The keyboard 20 may thus be implemented in several known ways and may eg be a numeric keyboard, alphanumeric keyboard, both numeric and alphanumeric keyboard, etc. Correspondingly, the card read input device 21 may be implemented in different known ways, eg as one which is a magnetic card reader, a chip card reader or any other card that can contain the necessary code. It is additionally noted that other types of input devices may be used of course. Among many possible options it may eg be mentioned that fingerprints, face recognition and voice recognition are used in connection with personal recognition, and that, on the basis thereof, the control device 1 can select a person-specific state in which the computer is to operate.

It is noted that there are also several ways in which a user may be required to indicate one or more codes. It may eg be expedient to combine the input devices by entering these codes. For example, a user identification may be made in three stages: a code from a smart card reader 21, a PIN code entered via the keyboard 20, and the use of EPROM containing a unique number of the control device. These three numbers together will provide a high certainty of the user's physical presence at a given time and a given computer.

It is eg conceivable that a computer is used jointly by two users, and that each user is therefore given a code which specifies the desired state in which the computer is to operate when this user uses the computer. This may be described by the following example.

Several users may use the same machine with different rights and set-ups, there being used dedicated hardware for the individual user. For example, the same users may run different risks eg with respect to virus on various hardware configurations. Correspondingly, use of several operating systems in the same computer is made possible in a simple manner. Additionally, it may be ensured that a user's software does not destroy another user's set-up or data, such as eg the son's games or the father's accounts.

Figure 3:
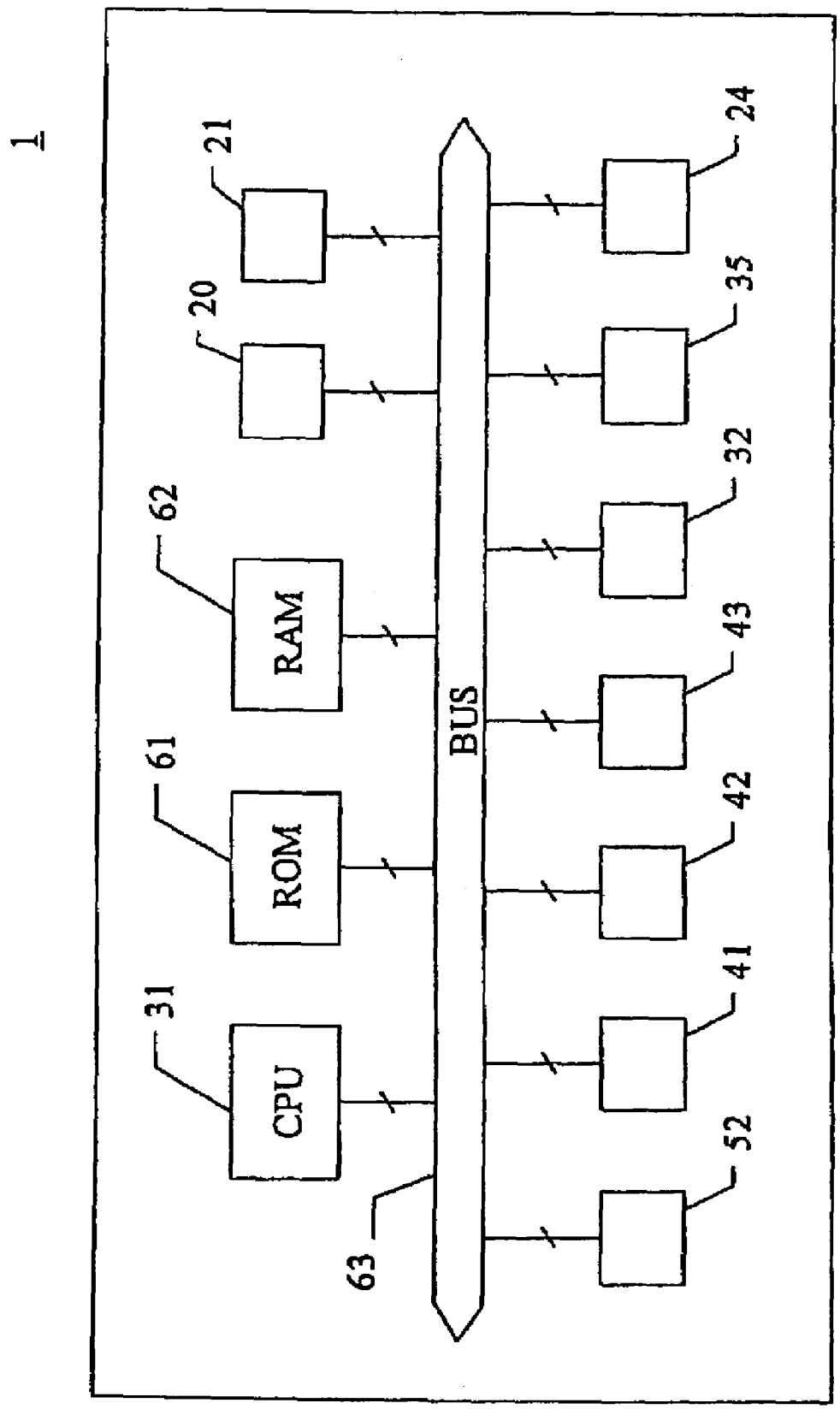
FIG. 3 shows a further embodiment of the prior art control device in FIG. 1.

As will appear from FIGS. 2 and 3, the control device 1 also comprises a supervisory unit 35. This supervisory unit 35 may eg be adapted to currently supervise contact with one or more of the connected operative units, and is adapted, on the basis thereof, to select the state in which the computer operates. This ensures that it is possible to record when an operative unit is connected or disconnected and optionally store relevant information on this, eg time, the change made and subsequent acts. On this basis, the control device 1 can determine the state in which the computer is to operate, eg that it must be brought into a locked state where further use is not readily possible for a user without special system rights. The various conditions in connection with modem, network card and ISDN adapter will be described below.

In connection with a connected modem the control device expediently uses a modem control unit. This modem is adapted to be disconnected or connected according to user ID and user set-up determined by the administrator. The modem control device is an electronic unit that interrupts the line physically in the modem before ring detection. Hereby, the modem cannot be controlled through the line. This ensures that modem set-up is controlled according to user ID and set-up. Also provided is a sensor circuit for measuring whether the telephone line has been interrupted as a safeguard against switching of connections to external networks (unintentional change bypassing ID). This takes place by measuring the line voltage.

A network card is adapted to be disconnected or connected according to user ID and user set-up determined by the administrator. Also provided is a sensor circuit for measuring whether the network line (UTP) has been interrupted as a safeguard against switching of connections to external networks (unintentional change bypassing ID). A sensor circuit measures the presence of connection/disconnection of a network connecting line (patch cable). Furthermore, the link signal is also read in standby (only mains voltage on the power supply). This is a security for the network administrator that a user or others do not malevolently or unintentionally switch the network connections. In case of interruptions or switching of networks, the control device locks the machine and all hardware is interrupted until a valid condition of access (smart card, password, etc.) has been satisfied. The set-up determines who has administrator rights.

An ISDN adapter is adapted to be disconnected or connected according to user ID and user set-up determined by the administrator. Also provided is a stimulation/sensor circuit for measuring whether the ISDN connection has been interrupted as a safeguard against switching of connections to external networks (unintentional change bypassing ID). This is a security for the network administrator that a user or others do not malevolently or unintentionally switch network connections. In case of interruptions or switching of ISDN the control device locks the machine and all hardware is interrupted until the condition of access (smart card, password, etc.) has been satisfied. The set-up determines who has administrator rights.

As will appear from FIG. 2, the control device 1 comprises a cabinet 50. In the same manner as described in connection with the cabinet 2 of the computer, the control device may be adapted to select the state in which the computer is to operate on the basis of information on whether the cabinet has been opened.

Although it is not shown directly in FIG. 2, a control device 1 will expediently be based on a control unit, which performs the control of the operative units of the computer in cooperation with the other parts of the control device 1. This is described more fully in connection with FIG. 3.

FIG. 3 shows a simple example of how the control device may conceivably be built. The control device comprises a control unit 31 which may be a normal CPU, a ROM 61 that can contain a program code and static data, as well as a RAM 62 that may be used in a known manner as a data storage which may be changed currently. These units may eg be connected to a data/control bus 63, just as the other units of the control device 1 may be connected to this bus 63. As will appear from FIG. 3, a control device 1 will thus be in the form of an ordinary computer in this embodiment, and in this situation the control device is thus basically built as a PC which may be incorporated in another computer so that the control device 1 can connect and disconnect operative units in the computer 19 depending on the state thereof.

The face that the control device 1 may be built as an independent computer in the host computer 19 gives a number of advantages. For example, it provides the possibility of using the control device 1 for independent work on the Internet. The advantage of this property is that, without any risk of spreading of virus from the network, a user can be on the Internet simultaneously with local networks without having to re-start the PC.

Thus, in addition to providing the possibility of controlling rights at hardware level, the control device 1 also provides the possibility of using state-specific user interfaces. It should be stressed that the control device 1 may be implemented in several ways, but as an example it may be mentioned that this may conceivably be constructed such that it can be built into a standard 5¼ inch slot in an ATX 2.01 (or higher) compatible PC, but it may also conceivably be connected in a suitable manner to any other computer.

When the means 24 specifying a relation between codes and states are stored in a non-volatile memory, it is ensured that these rights can be specified only by a selected person, eg a system administrator who has special access to these, eg by being allowed to use the computer in a state which gives both read and write rights to the means 24.

In an embodiment, the control device 1 comprises a supervisory unit 35, which is connected to one or more connections to the peripheral units of the computer 19. This is particularly expedient when the supervisory unit is connected to peripheral units, which it is possible to identify. Hereby, security may be obtained eg against switching of connections to units, eg connections to external networks.

In a further embodiment, the supervisory unit 35 comprises a measuring device 42, which is connected to the means 32. The measuring device is adapted to perform measurement of operational data, such as air humidity, temperature, shakes/vibrations, current, voltage and effect at suitable places in the computer, and, on the basis thereof, the control device 1 is adapted to select the state in which the computer operates. Operational voltages are measured eg on power supply and peripheral units. The power consumption is determined eg on the basis of current/voltage measurements on operative units and in total from the power supply.

This protects against damage to operative units because of unacceptable "operational data", eg when a given specified threshold value is exceeded.

In a further expedient embodiment, the supervisory unit 35 comprises a timer 41 which may likewise be connected to the means 32. The timer or the clock 41 may eg be used for measuring the total amount of time which a given user has used the computer or selected operative units, such as modem or other, but may also be used for ensuring that the computer can only be used for given purposes at given points in time by given users. This control may be performed in that the clock 41 is eg connected to the means 32 which perform suitable disconnection of operative units on the basis of information from the clock.

It is noted that the figures are schematic and simplified for clarity, and they just show details, which are essential to the understanding of the invention, while other details are omitted. The same reference numerals have been used throughout for identical or corresponding parts.

Some examples of embodiments of a control device according to the invention and a computer with a circuit according to the invention have been shown in the foregoing. It should be stressed, however, that the invention is not restricted to the embodiments shown, but may be embodied in other ways within the subject matter defined in the following claims. For example, the control device 1 may comprise an output device, such as an LCD display or a conventional screen. This ensures that the control device can provide the user with various items of information. However, the control device may also be connected to the screen of the computers and be adapted to provide the user with information via the screen.

Figure 4:
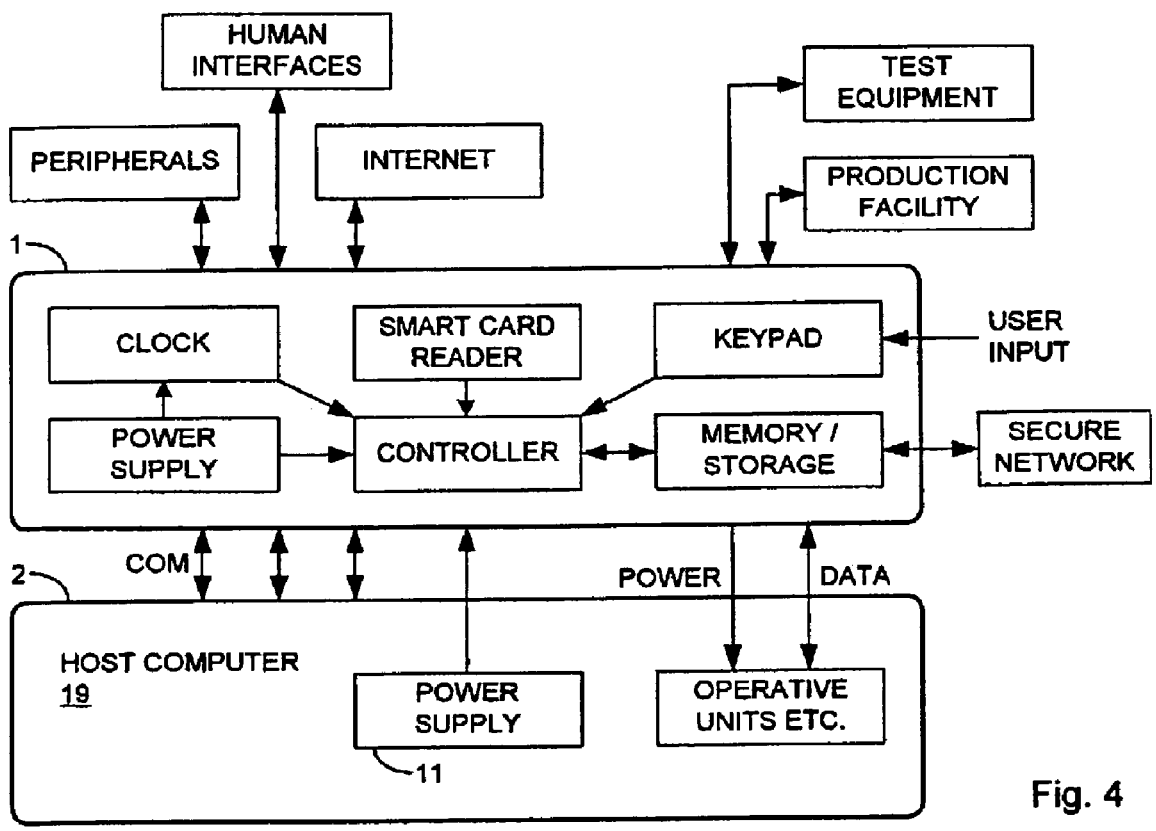
FIG. 4 shows a schematic block diagram of a control device according to the invention used with a computer.

In FIG. 4 is shown the host computer 19 the power supply 11 and operative units in the computer cabinet 2. The box named "operative units etc." may include the operative units identified above in connection with FIG. 1.

The control device 1 of the invention is a self-contained computer the size of eg a CD-ROM drive to be installed on the front of the existing PC—the host PC. The control device 1 has its own power supply for powering the operative units in the control device. The user interface preferably comprises a display such as an alpha-numerical display, a numerical keyboard and eg a smart card reader. Further, the operative units include a clock and a memory.

In FIG. 4 the host computer 19 is connected to human interfaces such as a keyboard and a mouse, peripherals such as a printer, and a network such as the Internet or other public or closed network. Further, the host computer 19 is connected to test or measuring equipment for performing measurements during research and development of eg new pharmaceuticals or medical devices, and to a production facility producing eg pharmaceuticals or medical devices, where the host computer controls the production process, possibly by human intervention. It is an important feature of the invention that all human intervention and all communication between the host computer and the human interfaces, the peripherals, the network, the test equipment and the production facility goes through the control device 1, where all such communication is recorded and stored. In accordance with the actual user profiles the control device 1 can be configured to allow or disallow selected ones of the connections to be made.

Not only does the control device of the invention control which operative units the actual user has access to, but certain functions can also be enabled or disabled in accordance with the actual user profile. Like any other activity, an attempt to activate a disallowed function will be recorded and may, depending on the circumstances, cause an appropriate action to be taken.

The operative units in the host computer are powered from the power supply 11 in the host computer 19. However, unlike in traditional computers, all power lines from the power supply 11 are connected through the control device, which connects and disconnects the power supply to the individual ones of the operative units in the host computer in accordance with the actual user profile.

Importantly, the control device 1 records all communication to and from the host computer 19 and stores the communication in the memory of the control device together with identification of the user and the actual time as retrieved from the internal clock in the control device 1.

The operation of the control device is fully autonomous and requires no data connection to the PC. It has an internal clock and a number of I/Os enabling monitoring and management of a large number of components in and around the PC. To enable the device to operate in a standalone system, it has a secure memory. The user can access neither of the clock and the memory, and the clock and the memory can thus not be set or altered by the user.

The control device has its own built-in network interface card allowing direct communication with a secure network such as a GXP network drive, where relevant, without the equipment on which it is installed having access to the network.

The control device of the invention is a self-contained computer, it requires no driver to be installed on the PC, and accordingly it is generally not necessary to install software on the existing equipment. This makes for ease of validation of the control device because it does not have to be validated in connection with existing software.

The control device is independent of software on the existing equipment and is therefore fully independent of operating system and platform and of the application software installed on the host computer. This makes it a very efficient solution that can be used in any type of PC, under any operating system and any application software, even in Macintosh and PLC systems.

21 CFR Part 11 makes a number of requirements in respect of physical access control for equipment as a condition for obtaining compliance. The fact that the control device of the invention controls the power supply to all operative units in the computer in which it is installed allows it to effectively protect against unauthorized use of the computer and its associated equipment. An unauthorized user would simply not be able to switch on the equipment.

The access control consists of a combination of a Smart Card and a user password. The password and Smart Card are verified internally in the isolated control device, protecting against common methods of stealing passwords. The system design requires users to change passwords regularly in accordance with a set time schedule and to create passwords along a given set of rules.

An administrator may change a password if a user forgets his password. All log-in events, including unauthorized log-in attempts and erroneous log-ins, will be time-stamped and recorded in a log file in the internal memory of the control device, which cannot be accessed by the user. To prevent attempted log-ins with eg stolen cards, the time-delay is doubled each time an incorrect password is entered, the maximum delay being 60 minutes. This makes it effectively impossible to sample the code in repeated attempts.

Another mandatory FDA requirement is for the equipment to have a log-off function that prevents others from using the equipment if a user leaves it, for example during a test.

The control device of the invention permits users, by taking their Smart Card with them when leaving the PC, to block access to the computer, even if other users normally have access to the system. The control device controls this by physically disconnecting the keyboard and mouse. The computer might potentially interpret a disconnected keyboard, mouse or other user interface as an error. In order to prevent such error the control device emulates passive user interfaces instead of disconnected user interfaces.

The display of the control device of the invention identifies the user who has locked the system. A group of users may, however, be granted access to take over work initiated by others in the group. Such shared access is naturally logged/recorded in the log file with the individual user's identity, event and time-stamp. An administrator can always unlock the keyboard and mouse, but this will also be recorded in the log file, and the control device display allows the user to see that the administrator has accessed the system.

Furthermore, after a specified period of time without user activity, the control device of the invention automatically logs the user off to protect against the eventuality that a user leaves the equipment without removing his personal identification card. In such cases, the user must remove his card, insert it again, and re-enter his password on the keyboard to unlock the system.

The administrator may centrally control the access of individual users to one or more devices or domains by changing the user's card. Users may also be granted rights to use different user profiles or be attached to a user team, enabling team members to take over work initiated by others in the team. Any changes made by the administrator to the rights of a user or to user profiles are recorded in the log file.

As described above, the control device of the invention controls all the internal operative devices (eg hard disk) of the PC system simply by switching power on or off. Each operative device is controlled individually and associated with one or more profiles. A profile is therefore most adequately described as a combination of devices that are active (powered) when the profile starts up.

Thus, one user profile may be excluded from using CD-ROM and disk drives, while another profile has full access. This makes it possible to control whether software and data is allowed to be added to or removed from the system or the network.

The use of two hard disks with individual profiles in the same PC makes it possible to maintain two galvanically separate configurations on one PC system. The control device of the invention also permits access to two galvanically separate networks on the same PC without any risk of data or viruses spreading between the two networks. This requires, in addition to two hard disks, also two network interface cards, which the control device of the invention controls two by two, ie each hard disk and its associated network interface card as a couple, so that they are never interconnected.

It is also possible to develop special solutions to control and log users who use the individual function buttons on, for example, a PLC.

The control device of the invention uses a recorder to generate an exact and complete raw data copy. The recorder logs all data exchanged between, for example, a research PC having a control device of the invention and connected measuring equipment. The data is time-stamped and recorded together with information on the user of the system in the secure internal memory of the control device to create a complete log of who measured what when. If used in a computer connected to a production facility controlled by the computer, the recorder logs all data exchanged between the computer and the production facility.

To further ensure a complete audit trail on the PC system, all keystrokes are captured in the log file, retaining a complete log of who made what keystrokes and when the keystrokes were made.

Where software is installed on existing equipment, a COM component may be installed that allows audit trail extraction from existing software or databases, and storage of such audit trail with a secure time and user stamp in the memory of the control device, which cannot be accessed by the users.

The keyboard logger also permits restrictions to be imposed on individual users' functionality in existing software. The control device ensures that certain functions corresponding to certain keystroke combinations may be excluded from being executed if the functions are not compatible with the actual user profile. The user is thereby prevented from taking certain actions. This feature may be used to block the use of certain functions in, for example, a SCADA PC.

Furthermore, when the user removes his card from the control device, it is possible to send a keystroke combination, which, for example, logs the user off an application.

The control device of the invention offers protection against attempted PC cabinet break-ins or attempts to switch/disconnect cables from the PC. Such attempts will set off an alarm, and the power to the equipment will be cut off. Only the administrator will be able to re-start the system. Such events are, naturally, also recorded in the secure log file of the control device.

The control device of the invention is fitted with back up batteries to ensure complete supervision and logging even in case of a prolonged power failure.

The control device of the invention has a flash-RAM memory of an appropriate size to store all recorded data (the log file). The user of the equipment cannot access the memory.

The log file can only be retrieved from the control device, if the administrator logs in and selects to read out the log file directly to the chosen storage destination. It will not be possible to change or delete the log file.

The file is stored as a numbered, read-only file with an electronically generated check sum. This makes it impossible to modify the file, and makes it possible to see whether a log file is missing. The related management program allows the file to be converted into a human readable, electronic format.

A warning to clear the log appears on every log-in when the memory of the control device has been filled up to a predefined level, say 80% full. If the log is not cleared, and the memory capacity is full, the control device of the invention prevents the equipment from being used until an administrator has cleared the log. When the administrator reads out a log file this is, naturally, recorded in a new log file.

Another possibility is to store the log file directly on a secure network such as a GXP network drive when it is generated. This can be done due to the ability of the control device to communicate, independently of the PC, on a network other than that of the PC. Using a network eliminates the need to move the log files and the risk of the log file filling up.

The control device of the invention has its own clock, which cannot be set by the user, and time-stamps cannot, therefore, be disturbed. All data that are recorded by the control device are time stamped with the time signal from the clock in the control device. There are various possibilities of synchronizing the clock of the control device, for example by using common network time.

The control device of the invention is available in two versions: one which functions as access control, user log and log-off function, and another which offers all the functionality described above. Both versions can be installed and set up by trained IT personnel having ordinary knowledge of the structure of a PC. For ATX compatible equipment, no major measures are required in respect of the host PC apart from ordinary re-cabling.

In order to safeguard against attempts to physically change the network eg by disconnecting existing connections or by adding new connections, the control device of the invention offers a unique hardware solution for monitoring the integrity on NIC, HUB and SWITCH level. The hardware solution is not limited to the use in a system as described here, but it can also be an independent unit connected to the physical network. The solution is not limited to the control of physical networks, but it can connect and disconnect a keyboard, a mouse, USB ports, serial ports, standard bus systems etc. The following problems are solved:

Detection of a change or a disconnection of the physical network

Figure 5:
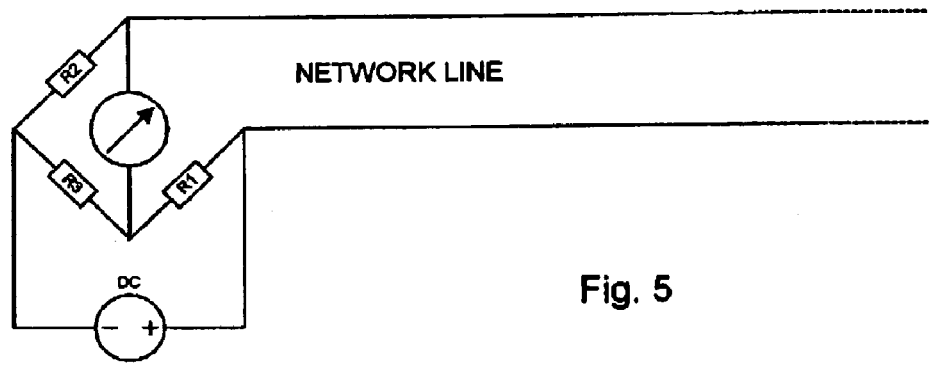
FIG. 5 shows the basic principle of a measuring bridge used to detect possible failures or intrusions on the network.

Detection of a change or a disconnection of the physical network also if the monitored network is powerless Signaling for an action to be taken on the event Storing the event as a state that can be subsequently read by a connected control and validation system, eg the control device of the invention Does not constitute a load to the monitored network within the nominal ranges of frequency, amplitude and impedance The network can be connected or disconnected by the control and validation system, eg the control device of the invention Peripheral units can be connected or disconnected by the control and validation system, eg the control device of the invention FIG. 5 shows the fundamental principle of a measuring bridge used. The system is based on the nominal electrical specifications of the physical network as defined by relevant standards or particular specifications. An electrical measuring loop or bridge including the network as a branch of the bridge is established, which in its normal state is stable. The impedance of the network is known. If the network is broken or a connected unit is disconnected, or a change is detected, which exceeds a set threshold, an error signal is generated and stored in a memory and sent to a control and validation system, eg the control device of the invention.

The measuring bridge may measure either the steady state DC resistance or characteristic AC impedance of the network or both. The DC measurement is preferred, but the invention is not limited thereto. An AC measurement is performed by forming a measuring bridge with the network impedance as one branch and an internal reference impedance as the other branch. The measuring bridge can be set up to measure both the real component and the imaginary component of the impedance. As an alternative to the steady state measurement the network can be excited using an impulse and the resulting reflected signal can be measured.

The DC method is preferred because of its simplicity. A simple measuring bridge with pure resistances R1, R2 and R4 and a battery operated, galvanically separate power supply sends a weak DC current through the network. With the network intact the measuring bridge is in balance, and no signal is detected. Any disconnection of a connection in the network will result in an unbalance in the bridge, and a comparator in the detection circuit will shift its output triggering a flip-flop, which in turn will activate a warning in the control and validation system, eg the control device of the invention.

In case of AC measurements being performed, complex impedances can replace the resistances R1, R2 and R3, and the signal source will supply an AC signal. The bridge can be a four-armed balance bridge as shown or a two-armed half bridge, which are both known as such.

The invention claimed is:

1. A control device for use with a computer having one or more connectors for connecting equipment to the computer thereby communicating with equipment connected to the one or more connectors, comprising:
   one or more first connectors for connecting the equipment to the control device,
   one or more second connectors for connecting the control device to the one or more connectors of the computer to exclusively control whether the computer communicates with the equipment connected to the one or more first connectors,
   a memory and a controller for storing communication between the computer and the equipment connected to the one or more first connectors, said stored communication including an exact and complete copy of data exchanged between the computer and the equipment, a respective identification of a user of the equipment which requests data exchange, and a time stamp of the data exchange.

2. A control device according to claim 1, further having means for individually controlling connecting or disconnecting a power supply of the computer to each of operative units in the computer.

3. A control device according to claim 2, further having an input device by means of which a user may input a user specific code, the control device being adapted to individually connect or disconnect the power supply to each of the operative units in the computer in dependence on the user specific code.

4. A control device according to claim 2, further having an input device by means of which a user may input a user specific code, and a user interface for use by the user to input instructions to the computer, the control device being adapted to allow or disallow per instruction or per function for each of predefined instructions or functions input by the user to be processed by the computer.

5. A control device according to claim 4, wherein instructions that are disallowed to be processed by the computer, are prevented from being sent to the computer.

6. A control device according to claim 1, further having means for individually controlling connecting or disconnecting data communication lines to each of operative units in the computer.

7. A control device according to claim 6, further having an input device by means of which a user may input a user specific code, the control device being adapted to individually connect or disconnect the data communication lines to each of the operative units in the computer in dependence on the user specific code.

8. A control device according to claim 1, further having a connector for connecting the control device to a mass storage device for storing the communication between the computer and the equipment connected to the one or more first connectors.

9. A control device according to claim 8, wherein the connector for connecting the control device to a mass storage device is a connector to a secure network.

10. A control device according to claim 1, further having an input device by means of which a user may input a user specific code, wherein data representing the user specific code is stored together with the communication between the computer and the equipment connected to the one or more first connectors.

11. A control device according to claim 1, further having a clock generating the time stamp of the data exchange.

12. A control device according to claim 1, further having a generator for generating an electrical signal to be transmitted via selected ones of the one or more first and second connectors, and means for detecting changes in transmission properties of the transmitted electrical signal.

13. A control device according to claim 12, wherein the means for detecting changes as in transmission properties of the transmitted electrical signal includes electrical impedances coupled in a bridge configuration.

14. A control device according to claim 12, wherein the changes detected includes a change in an electrical impedance of at least a part of a network coupled with the control device.

15. A control device according to claim 12, wherein data indicating an occurrence of the change is stored in the memory.

16. A control device according to claim 1, further having a generator for generating an electrical signal to be transmitted via selected one or more of the one or more first connectors and the one or more second connectors, and means for monitoring a signal reflected via the selected one or more of the one or more first connectors and the one or more second connectors.

17. A control device according to claim 16, wherein data indicating an occurrence of a change in the signal reflected is stored in the memory.

18. A control device according to claim 1, wherein the control device is independent of at least one of an operating system and a platform of the computer, application software installed in the computer, and software running equipment.

19. A control device according to claim 1, wherein the control device is disposed in the computer, and the computer includes:
   a motherboard;
   one or more operative units;
   a power supply unit for supplying electrical power to the motherboard and to the one or more operative units;
   electrical interconnections for interconnecting the motherboard, the one or more operative units and the power supply unit; and one or more connectors for connecting equipment to the computer, wherein the computer communicates with the equipment connected to the one or more connectors.

20. A control device according to claim 1, wherein said stored communication further includes log-in events which includes unauthorized log-in attempts and erroneous log-ins.

21. A control device according to claim 1, wherein said stored communication further includes keystrokes and users entered the keystrokes.

22. A control device according to claim 1, wherein said communication in stored in a read-only file with an electronically generated check sum.

23. A computer, comprising a motherboard;
one or more operative units;
a power supply unit for supplying electrical power to the motherboard and to the one or more operative units;
electrical interconnections for interconnecting the motherboard, the one or more operative units and the power supply unit;
one or more connectors; and,
a control device having one or more first connectors connected to the equipment, one or more second connectors connected the control device to the one or more connectors of the computer exclusively control whether the computer communicates with the equipment connected to the one or more first connectors, a memory and a controller for storing communication between the computer and the equipment connected to the one or more first connectors, said stored communication including an exact and complete copy of data exchanged between the computer and the equipment, a respective identification of a user of the equipment which requests data exchange, and a time stamp of the data exchange.

24. A control device for use with a computer having one or more connectors for connecting equipment to the computer thereby communicating with equipment connected to the one or more connectors, comprising:
one or more first connectors for connecting the equipment to the control device,
one or more second connectors for connecting the control device to the one or more connectors of the computer to exclusively control whether the computer communicates with the equipment connected to the one or more first connectors,
a memory for storing communication between the computer and the equipment connected to the one or more first connectors, said stored communication including an exact and complete copy of data exchanged between the computer and the equipment, a respective identification of a user of the equipment which requests data exchange, and a time stamp of the data exchange; and
a controller adapted to control the communication between the computer and the equipment.

25. A control device according to claim 24, further having means for individually controlling connecting or disconnecting a power supply of the computer to each of operative units in the computer.

26. A control device according to claim 25, further having an input device by means of which a user may input a user specific code, the control device being adapted to individually connect or disconnect the power supply to each of the operative units in the computer in dependence on the user specific code.

27. A control device according to claim 25, further having an input device by means of which a user may input a user specific code, and a user interface for use by the user to input instructions to the computer, the control device being adapted to allow or disallow per instruction or per function for each of predefined instructions or functions input by the user to be processed by the computer.

28. A control device according to claim 27, wherein an instruction that is disallowed to be processed by the computer, is prevented from being sent to the computer.

29. A control device according to claim 25, wherein the means for detecting changes as in transmission properties of the transmitted electrical signal includes electrical impedances coupled in a bridge configuration.

30. A control device according to claim 24, further having means for individually controlling connecting or disconnecting data communication lines to each of operative units in the computer.

31. A control device according to claim 30, further having an input device by means of which a user may input a user specific code, the control device being adapted to individually connect or disconnect the data communication lines to each of the operative units in the computer in dependence on the user specific code.

32. A control device according to claim 24, further having means for connecting the control device to a mass storage device for storing the communication between the computer and the equipment connected to the one or more first connectors.

33. A control device according to claim 32, wherein the connector for connecting the control device to a mass storage device connects to a secure network.

34. A control device according to claim 24, further having an input device by means of which a user may input a user specific code, wherein data representing the user specific code is stored together with the communication between the computer and the equipment connected to the one or more first connectors.

35. A control device according to claim 24, further having a clock generating the time stamp of the data exchangel.

36. A control device according to claim 24, further having a generator for generating an electrical signal to be transmitted via selected one or more of the one or more first connectors and the one or more second connectors, and means for detecting changes in transmission properties of the transmitted electrical signal.

37. A control device according to claim 24, wherein the control device is independent of at least one of an operating system and a platform of the computer, application software installed in the computer, and software running equipment.

38. A method of controlling connection between a computer and equipment, comprising the steps of:
connecting one or more first connectors of a control device to the equipment;
connecting one or more second connectors of the control device to one or more connectors of the computer to exclusively control whether the computer communicates with the equipment connected to the one or more first connectors; and
storing communication between the computer and the equipment connected to the one or more first connectors, said stored communication including an exact and complete copy of data exchanged between the computer and the equipment, a respective identification of a user of the equipment which requests data exchange, and a time stamp of the data exchange.

39. A method according to claim 38, further comprising the step of individually controlling connecting or disconnecting a power supply of the computer to each of operative units in the computer.

40. A method according to claim 39, further comprising inputting a user specific code via an input device, and individually connecting or disconnecting the power supply to each of the operative units in the computer according to the user specific code.

41. A method according to claim 39, wherein the means for detecting changes as in transmission properties of the transmitted electrical signal includes electrical impedances coupled in a bridge configuration.

42. A method according to claim 38, further comprising the step of individually controlling connecting or disconnecting data communication lines to each of operative units in the computer.

43. A method according to claim 42, further comprising inputting a user specific code via an input device, and individually connecting or disconnecting the data communication lines to each of the operative units in the computer in accordance with the user specific code.

44. A method according to claim 38, further comprising the step of connecting the control device to a mass storage device for storing the communication between the computer and the equipment connected to the one or more first connectors.

45. A method according to claim 38, wherein the connector for connecting the control device to a mass storage device connects to a secure network.

46. A method according to claim 38, further comprising the steps of:
   inputting a user specific code via an input device,
   inputting a predefined instruction to the computer via a user interface, and
   allowing or disallowing per instruction for each of predefined instructions inputted by the user to be processed by the computer.

47. A method according to claim 46, further comprising the step of preventing an instruction that is disallowed to be processed by the computer from being sent to the computer.

48. A method according to claim 38, further comprising the steps of:
   inputting a user specific code via an input device; and
   storing data representing the user specific code together with the communication between the computer and the equipment connected to the one or more first connectors.

49. A method according to claim 38, further comprising the steps of:
   generating the time stamp of the data exchange.

50. A method according to claim 38, further comprising the steps of:
   generating an electrical signal to be transmitted via selected one or more of the one or more first connectors and the one or more second connectors; and
   detecting changes in transmission properties of the transmitted electrical signal.

51. A method according to claim 50, wherein the change detected includes a change in an electrical impedance of at least a part of a network coupled with the control device.

52. A method according to claim 38, wherein the control device is independent of at least one of an operating system and a platform of the computer, application software installed in the computer, and software running equipment.

* * * * *